United States Patent
Emaru et al.

(10) Patent No.: US 8,060,478 B2
(45) Date of Patent: Nov. 15, 2011

(54) STORAGE SYSTEM AND METHOD OF CHANGING MONITORING CONDITION THEREOF

(75) Inventors: Hironori Emaru, Yokohama (JP);
Nobuhiro Maki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 611 days.

(21) Appl. No.: 12/213,524

(22) Filed: Jun. 20, 2008

(65) Prior Publication Data

US 2009/0271445 A1    Oct. 29, 2009

(30) Foreign Application Priority Data

Apr. 25, 2008    (JP) ................................ 2008-115878

(51) Int. Cl.
*G06F 7/00*        (2006.01)
(52) U.S. Cl. ..................................................... 707/654
(58) Field of Classification Search .................. 714/1, 2, 714/3, 13; 711/154, 162; 707/640, 644, 707/648, 654
See application file for complete search history.

(56) References Cited

U.S. PATENT DOCUMENTS

| | | | |
|---|---|---|---|
| 7,240,238 B2 * | 7/2007 | Yanai et al. | 714/6.32 |
| 2002/0078296 A1 * | 6/2002 | Nakamura et al. | 711/114 |
| 2007/0220322 A1 | 9/2007 | Mikami | |
| 2008/0244579 A1 * | 10/2008 | Muller | 718/100 |

FOREIGN PATENT DOCUMENTS

JP    2007-249447    3/2006

* cited by examiner

*Primary Examiner* — Angela Lie
(74) *Attorney, Agent, or Firm* — Stites & Harbison PLLC; Juan Carlos A. Marquez, Esq.

(57) ABSTRACT

The management burden of a replication administrator is alleviated and the monitoring burden is reduced in a storage system. In a large-scale storage system configured across a plurality of sites, a management computer managing the storage system collects configuration information of a volume group such as the copy pair status information from a host computer of the respective sites including a primary site and a remote site, and analyzes the collected information. When a failure or a disaster occurs and the primary site and the remote site are switched and the management computer detects a change in the configuration of the volume group, and appropriate switches the monitoring configuration upon determining the configuration of the detected change.

13 Claims, 12 Drawing Sheets

FIG.5

| # | PAIR STATUS | DISASTER STATUS | MONITORING CONFIGURATION | |
|---|---|---|---|---|
| 1 | P: PAIR(P)<br>R: PAIR(S) | NORMAL<br>(NO DISASTER) | P: PAIR(P)<br>R: STOP | 5010 |
| 2 | P: N/A(H)<br>R: SMPL | PRIMARY SITE<br>DISASTER | P: STOP<br>R: SMPL | 5020 |
| 3 | P: N/A(H)<br>R: PAIR(P) | FAILURE IN HOST<br>COMPUTER OF<br>PRIMARY SITE | P: STOP<br>R: PAIR(P) | 5030 |
| 4 | P: N/A(S)<br>R: SSWS | FAILURE IN STORAGE<br>APPARATUS OF<br>PRIMARY SITE | P: STOP<br>R: SSWS | 5040 |
| 5 | P: SMPL<br>R: N/A(H) | REMOTE SITE<br>DISASTER | P: SMPL<br>R: STOP | 5050 |
| 6 | P: PAIR(P)<br>R: N/A(H) | FAILURE IN HOST<br>COMPUTER OF<br>REMOTE SITE | P: PAIR(P)<br>R: STOP | 5060 |
| 7 | P: PSUE<br>R: N/A(S) | FAILURE IN STORAGE<br>APPARATUS OF<br>REMOTE SITE | P: PSUE<br>R: STOP | 5070 |
| 8 | P: SUSP(P)<br>R: SUSP(S) | REMOTE NETWORK<br>DISASTER BETWEEN<br>SITES | P: SUSP(P)<br>R: SUSP(S) | 5080 |

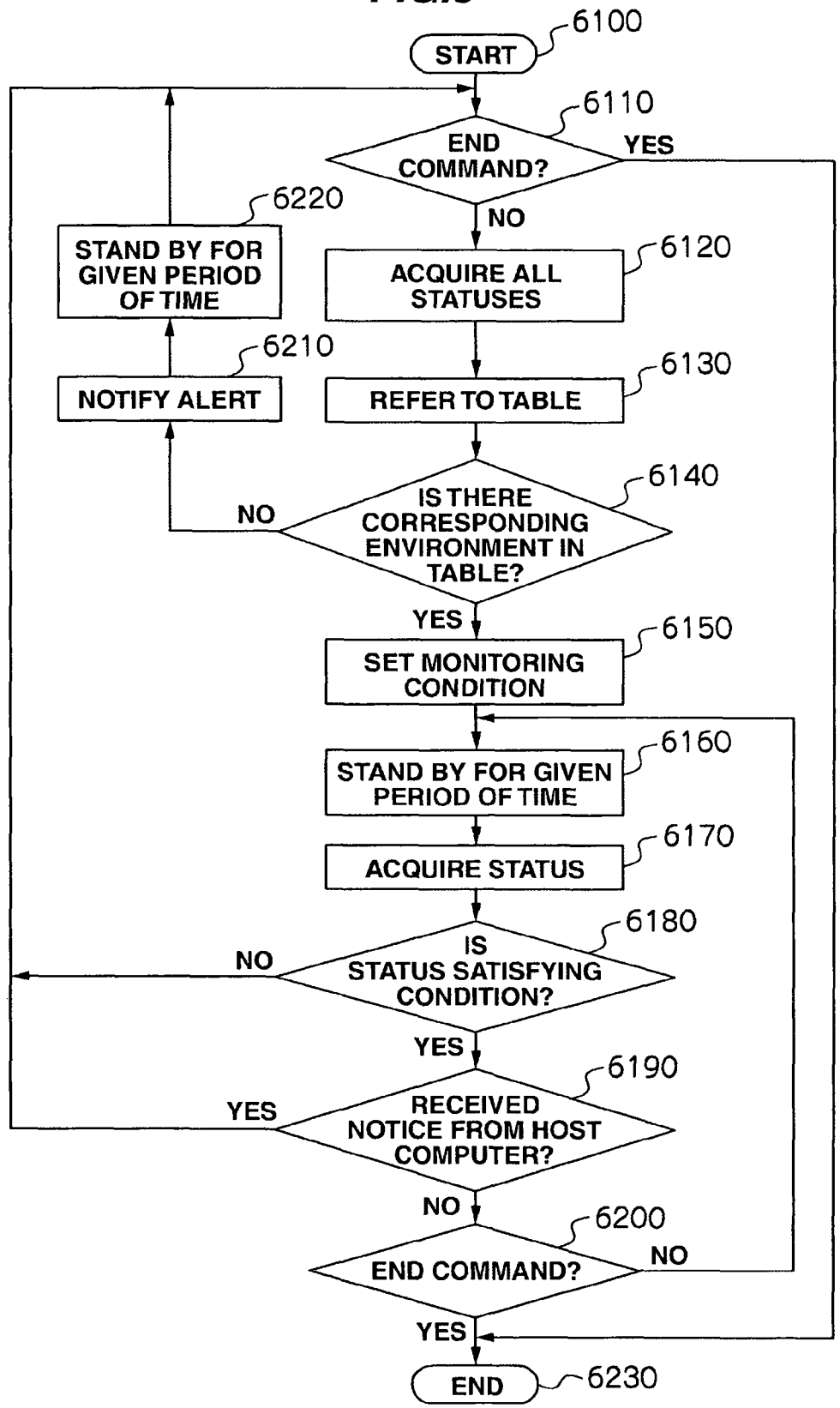

FIG.7

| # | PAIR STATUS | DISASTER STATUS | MONITORING CONFIGURATION | |
|---|---|---|---|---|
| 1 | P: PAIR(P)<br>R: PAIR(S) | NORMAL<br>(NO DISASTER) | P: PAIR(P), JNL<br>R: STOP | 7010 |
| 2 | P: N/A(H)<br>R: SMPL | PRIMARY SITE DISASTER | P: STOP<br>R: SMPL | 5020 |
| 3 | P: N/A(H)<br>R: PAIR(P) | FAILURE IN HOST COMPUTER OF PRIMARY SITE | P: STOP<br>R: PAIR(P), JNL | 7030 |
| 4 | P: N/A(S)<br>R: SSWS | FAILURE IN STORAGE APPARATUS OF PRIMARY SITE | P: STOP<br>R: SSWS | 5040 |
| 5 | P: SMPL<br>R: N/A(H) | SECONDARY SITE DISASTER | P: SMPL<br>R: STOP | 5050 |
| 6 | P: PAIR(P)<br>R: N/A(H) | FAILURE IN HOST COMPUTER OF SECONDARY SITE | P: PAIR(P), JNL<br>R: STOP | 7060 |
| 7 | P: PSUE<br>R: N/A(S) | FAILURE IN STORAGE APPARATUS OF SECONDARY SITE | P: PSUE<br>S: STOP | 5070 |
| 8 | P: SUSP(P)<br>R: SUSP(S) | REMOTE NETWORK DISASTER BETWEEN PRIMARY SITE AND SECONDARY SITE | P: SUSP(P)<br>R: SUSP(S) | 5080 |

FIG.8

| COPY PAIR NAME | COPY PAIR CAPACITY | JNL THRESHOLD VALUE | |
|---|---|---|---|
| CG01 | 300TB | 3.0TB | 8010 |

FIG.9

| # | PAIR STATUS | DISASTER STATUS | MONITORING CONFIGURATION | |
|---|---|---|---|---|
| 1 | P: PAIR(P)<br>R: PAIR(S) | NORMAL<br>(NO DISASTER) | P: PAIR(P)<br>R: STOP | 5010 |
| 2 | P: N/A(H)<br>R: SMPL | PRIMARY SITE<br>DISASTER | P: STOP<br>R: SMPL | 5020 |
| 3 | P: N/A(H)<br>R: PAIR(P) | FAILURE IN HOST<br>COMPUTER OF<br>PRIMARY SITE | P: STOP<br>R: PAIR(P) | 5030 |
| 4 | P: N/A(S)<br>R: SSWS | FAILURE IN STORAGE<br>APPARATUS OF<br>PRIMARY SITE | P: STOP<br>R: SSWS | 5040 |
| 5 | P: SMPL<br>R: N/A(H) | SECONDARY SITE<br>DISASTER | P: SMPL<br>R: STOP | 5050 |
| 6 | P: PAIR(P)<br>R: N/A(H) | FAILURE IN HOST<br>COMPUTER OF<br>SECONDARY SITE | P: PAIR(P)<br>R: STOP | 5060 |
| 7 | P: PSUE<br>R: N/A(S) | FAILURE IN STORAGE<br>APPARATUS OF<br>SECONDARY SITE | P: PSUE<br>S: STOP | 5070 |
| 8 | P: SUSP(P)<br>R: SUSP(S) | REMOTE NETWORK<br>DISASTER BETWEEN<br>PRIMARY SITE AND<br>SECONDARY SITE | P: SUSP(P)<br>R: SUSP(S) | 5080 |
| 9 | P: SUSP(P)<br>R: SUSP(S) | BACKUP IN<br>PROGRESS | P: SUSP(P)<br>R: SUSP(S) | 9090 |
| 10 | P: RESYNC(P)<br>R: RESYNC(S) | BACKUP END<br>PROCESSING IN<br>PROGRESS (RESYNCH) | P: RESYNC(P)<br>R: RESYNC(S) | 9100 |

FIG.10

| TIME | TASK | APPLICABLE RULE | |
|---|---|---|---|
| 2:00-3:00 | BACKUP | #9 | ~10010 |
| 3:00-3:10 | BACKUP END PROCESSING | #10 | ~10020 |
| 3:10-2:00 | NORMAL OPERATION | #1 | ~10030 |

| COPY PAIR NAME | COPY PAIR CAPACITY | JNL THRESHOLD VALUE | |
|---|---|---|---|
| CG01 | 300TB | 3.0TB | ~8010 |
| CG02 | 250TB | 2.5TB | ~12020 |

FIG.14

| # | PAIR STATUS | DISASTER STATUS | MONITORING CONFIGURATION | |
|---|---|---|---|---|
| 1 | P-TC: PAIR(P)<br>P-UR: PAIR(P)<br>L-TC: PAIR(S)<br>L-UR2: HOLD(P)<br>R-UR: PAIR(S)<br>R-UR2: HOLD(S) | NORMAL<br>(NO DISASTER) | P-TC: PAIR(P)<br>P-UR: PAIR(P)<br>L-TC: STOP<br>L-UR2: HOLD(P)<br>R-UR: STOP<br>R-UR2: STOP | 14010 |
| 2 | P-TC: N/A(H)<br>P-UR: N/A(H)<br>L-TC: SMPL<br>L-UR2: PAIR(P)<br>R-UR: SMPL<br>R-UR2: PAIR(S) | PRIMARY SITE DISASTER | P-TC: STOP<br>P-UR: STOP<br>L-TC: STOP<br>L-UR2: PAIR(P)<br>R-UR: STOP<br>R-UR2: STOP | 14020 |
| 3 | P-TC: N/A(H)<br>P-UR: N/A(H)<br>L-TC: PAIR(P)<br>L-UR2: PAIR(P)<br>R-UR: HOLD(S)<br>R-UR2: PAIR(S) | FAILURE IN HOST COMPUTER OF PRIMARY SITE | P-TC: STOP<br>P-UR: STOP<br>L-TC: PAIR(P)<br>L-UR2: PAIR(P)<br>R-UR: HOLD(S)<br>R-UR2: STOP | 14030 |
| 4 | P-TC: N/A(S)<br>P-UR: N/A(S)<br>L-TC: SSWS<br>L-UR2: PAIR(P)<br>R-UR: SSWS<br>R-UR2: PAIR(S) | FAILURE IN STORAGE APPARATUS OF PRIMARY SITE | P-TC: STOP<br>P-UR: STOP<br>L-TC: SSWS<br>L-UR2: PAIR(P)<br>R-UR: SSWS<br>R-UR2: STOP | 14040 |
| 5 | P-TC: SMPL<br>P-UR: PAIR(P)<br>L-TC: N/A(H)<br>L-UR2: N/A(H)<br>R-UR: PAIR(S)<br>R-UR2: SMPL | LOCAL SITE DISASTER | P-TC: STOP<br>P-UR: PAIR(P)<br>L-TC: STOP<br>L-UR2: STOP<br>R-UR: STOP<br>R-UR2: STOP | 14050 |
| 6 | P-TC: PAIR(P)<br>P-UR: PAIR(P)<br>L-TC: N/A(H)<br>L-UR2: N/A(H)<br>R-UR: PAIR(S)<br>R-UR2: HOLD(S) | FAILURE IN HOST COMPUTER OF LOCAL SITE | P-TC: PAIR(P)<br>P-UR: PAIR(P)<br>L-TC: STOP<br>L-UR2: STOP<br>R-UR: STOP<br>R-UR2: HOLD(S) | 14060 |
| 7 | P-TC: PSUE<br>P-UR: PAIR(P)<br>L-TC: N/A(S)<br>L-UR2: N/A(S)<br>R-UR: PAIR(S)<br>R-UR2: SSWS | FAILURE IN STORAGE APPARATUS OF LOCAL SITE | P-TC: PSUE<br>P-UR: PAIR(P)<br>L-TC: STOP<br>L-UR2: STOP<br>R-UR: STOP<br>R-UR2: SSWS | 14070 |

FIG.15

| # | PAIR STATUS | DISASTER STATUS | MONITORING CONFIGURATION | |
|---|---|---|---|---|
| 8 | P-TC: PAIR(P)<br>P-UR: SMPL<br>L-TC: PAIR(S)<br>L-UR2: SMPL<br>R-UR: N/A(H)<br>R-UR2: N/A(H) | REMOTE SITE DISASTER | P-TC: PAIR(P)<br>P-UR: STOP<br>L-TC: STOP<br>L-UR2: STOP<br>R-UR: STOP<br>R-UR2: STOP | ~14080 |
| 9 | P-TC: PAIR(P)<br>P-UR: PAIR(P)<br>L-TC: PAIR(S)<br>L-UR2: HOLD(P)<br>R-UR: N/A(H)<br>R-UR2: N/A(H) | FAILURE IN HOST COMPUTER OF REMOTE SITE | P-TC: PAIR(P)<br>P-UR: PAIR(P)<br>L-TC: STOP<br>L-UR2: HOLD(P)<br>R-UR: STOP<br>R-UR2: STOP | ~14090 |
| 10 | P-TC: PAIR(P)<br>P-UR: PSUE<br>L-TC: PAIR(S)<br>L-UR2: PSUE<br>R-UR: N/A(S)<br>R-UR2: N/A(S) | FAILURE IN STORAGE APPARATUS OF REMOTE SITE | P-TC: PAIR(P)<br>P-UR: PSUE<br>L-TC: STOP<br>L-UR2: PSUE<br>R-UR: STOP<br>R-UR2: STOP | ~14100 |
| 11 | P-TC: SUSP(P)<br>P-UR: PAIR(P)<br>L-TC: SUSP(S)<br>L-UR2: HOLD(P)<br>R-UR: PAIR(S)<br>R-UR2: HOLD(S) | REMOTE NETWORK DISASTER BETWEEN P-L | P-TC: SUSP(P)<br>P-UR: PAIR(P)<br>L-TC: SUSP(S)<br>L-UR2: HOLD(P)<br>R-UR: STOP<br>R-UR2: STOP | ~14110 |
| 12 | P-TC: PAIR(P)<br>P-UR: SUSP(P)<br>L-TC: PAIR(S)<br>L-UR2: HOLD(P)<br>R-UR: SUSP(S)<br>R-UR2: HOLD(S) | REMOTE NETWORK DISASTER BETWEEN P-R | P-TC: PAIR(P)<br>P-UR: SUSP(P)<br>L-TC: STOP<br>L-UR2: HOLD(P)<br>R-UR: SUSP(S)<br>R-UR2: STOP | ~14120 |
| 13 | P-TC: PAIR(P)<br>P-UR: PAIR(P)<br>L-TC: PAIR(S)<br>L-UR2: SUSP(P)<br>R-UR: PAIR(S)<br>R-UR2: SUSP(S) | REMOTE NETWORK DISASTER BETWEEN L-R | P-TC: PAIR(P)<br>P-UR: PAIR(P)<br>L-TC: STOP<br>L-UR2: SUSP(P)<br>R-UR: STOP<br>R-UR2: SUSP(S) | ~14130 |

STORAGE SYSTEM AND METHOD OF CHANGING MONITORING CONDITION THEREOF

CROSS-REFERENCES

This application relates to and claims priority from Japanese Patent Application No. 2008-115878, filed on Apr. 25, 2008, the entire disclosure of which is incorporated herein by reference.

BACKGROUND

The present invention generally relates to a storage system including a host computer, a storage apparatus and a management computer and to its monitoring condition setting method, and in particular can be suitably applied when changing the monitoring condition of a volume provided in the storage apparatus.

Pursuant to the advancement of information society, computer systems are being introduced throughout society, and the amount of data that is being processed is increasing explosively. Moreover, the importance of data that is handled in computer systems is increasing pursuant to the advancement of information society and, in addition to demands for higher reliability of the retained data, it is a social mission of information systems to prevent the loss of retained data from any and all disasters.

In this kind of system, volumes are multiplexed in order to guarantee the reliability of data. The data output from a host computer is copied to a volume in a directly-connected storage apparatus. Moreover the data is copied to another volume or a volume of another storage apparatus. Data is thereby duplicated to guarantee the reliability of data.

Generally speaking, a case where a volume for copying data is located in the same storage apparatus as the foregoing volume is referred to as a local copy, and a case where a volume for copying data is located in a storage apparatus separate from the foregoing volume is referred to as a remote copy, and these are applied to information systems demanded of high reliability. In addition, local copy and remote copy are sometimes collectively referred to as replication. According to this replication technology, even when a failure occurs in one volume and becomes inoperable, the system operation can be continued by using the data stored in the other volume. The two volumes of a copy source and a copy destination in a replication relationship are referred to as a copy pair.

Normally, copy pairs are grouped in host computer units or application units, and the control and monitoring of copy pairs are performed in such units. A plurality of copy pairs grouped in host computer units or application units are referred to as a copy group.

Japanese Patent Laid-Open Publication No. 2007-249447 discloses technology for monitoring the replication of a copy group in a storage system including a plurality of host computers and a plurality of storage apparatuses.

SUMMARY

In recent years, the importance of securing business continuity based on disaster recovery (DR) is increasing. The replication technology is often adopted as the elemental technology for realizing DR. In order to execute disaster recovery with certainty, it is necessary to detect the disaster as soon as possible by monitoring the monitor target according to the configuration thereof, change the storage system configuration as necessary, and thereby continue the system operation.

If the storage system is adopting a DR configuration and a main system (primary site) becomes a victim to disaster, a backup system (remote site) performs takeover operation according to a predetermined routine. Although this will secure the business continuity, it is necessary to change the previous monitoring method or monitoring condition in accordance with the configuration change arising as a result of the takeover processing.

In this case, since the configuration change and monitoring are conducted independently in conventional technology, an administrator needed to manually switch the monitoring configuration according to the configuration change. In particular, with disaster recovery where the storage system is configured across a broad area, the configuration change will affect a plurality of sites. Meanwhile, monitoring is performed in each site, and how the configuration is to be changed will depend on the level of disaster or failure. Thus, it is not possible to decide the monitoring condition in advance because it is not possible to determine whether the status that is being currently observed is correct for the overall system.

The present invention was made in view of the foregoing points. Thus, an object of this invention is to propose a storage system and a method of changing its monitoring condition capable of alleviating the management burden of the administrator and reducing the monitoring burden.

In order to achieve the foregoing object, the present invention provides a storage system comprising one or more storage apparatuses, one or more host computers for reading and writing data from and into the one or more storage apparatuses, and a management computer for managing the one or more host computers. The one or more storage apparatuses respectively include one or more disk devices for storing data, and a plurality of volumes configured from a storage area provided by the one or more disk devices. The one or more host computers manage configuration information of a volume group (for instance, a copy pair or a copy group) configured from a prescribed number of volumes among the plurality of volume. The management computer detects the status of a configuration change of a volume group by using the configuration information of the volume group and, upon detecting a configuration change, changes the configuration of a monitoring condition of the volume group based on the configuration of the monitoring condition according to the pre-set configuration of the volume group.

According to the foregoing configuration, in a large-scale storage system configured across a plurality of sites, a management computer of the storage system collects configuration information (for instance, status information of the copy pair) of a volume group from a host computer of the respective sites, and analyzes the collected information. When the management computer detects a change in the configuration of the volume group (for instance, when a failure or a disaster occurs and the main system and the backup system are switched), it is able to appropriately switch the monitoring configuration upon determining how the configuration was changed.

According to the present invention, it is possible to propose a storage system and a method of changing its monitoring condition capable of alleviating the management burden of the administrator and reducing the monitoring burden.

DESCRIPTION OF DRAWINGS

FIG. 5 is a diagram showing an example of a pair status monitoring table according to the first embodiment;

FIG. 6 is a flowchart showing the processing for setting the monitoring condition of a management program in the management computer according to the first embodiment;

FIG. 7 is a diagram showing an example of a pair status monitoring table according to the second embodiment of the present invention;

FIG. 8 is a diagram showing an example of a threshold value determination table according to the second embodiment;

FIG. 9 is a diagram showing am example of a pair status monitoring table according to a third embodiment of the present invention;

FIG. 10 is a diagram showing an example of a schedule table according to the third embodiment;

FIG. 14 is a diagram partially showing an example of a pair status monitoring table according to the fifth embodiment; and FIG. 15 is a diagram showing another part of an example of a pair status monitoring table according to the fifth embodiment.

DETAILED DESCRIPTION

The respective embodiments of the present invention are now explained with reference to the attached drawings. The present invention, however, shall not be limited by the following embodiments.

First Embodiment

Figure 1:
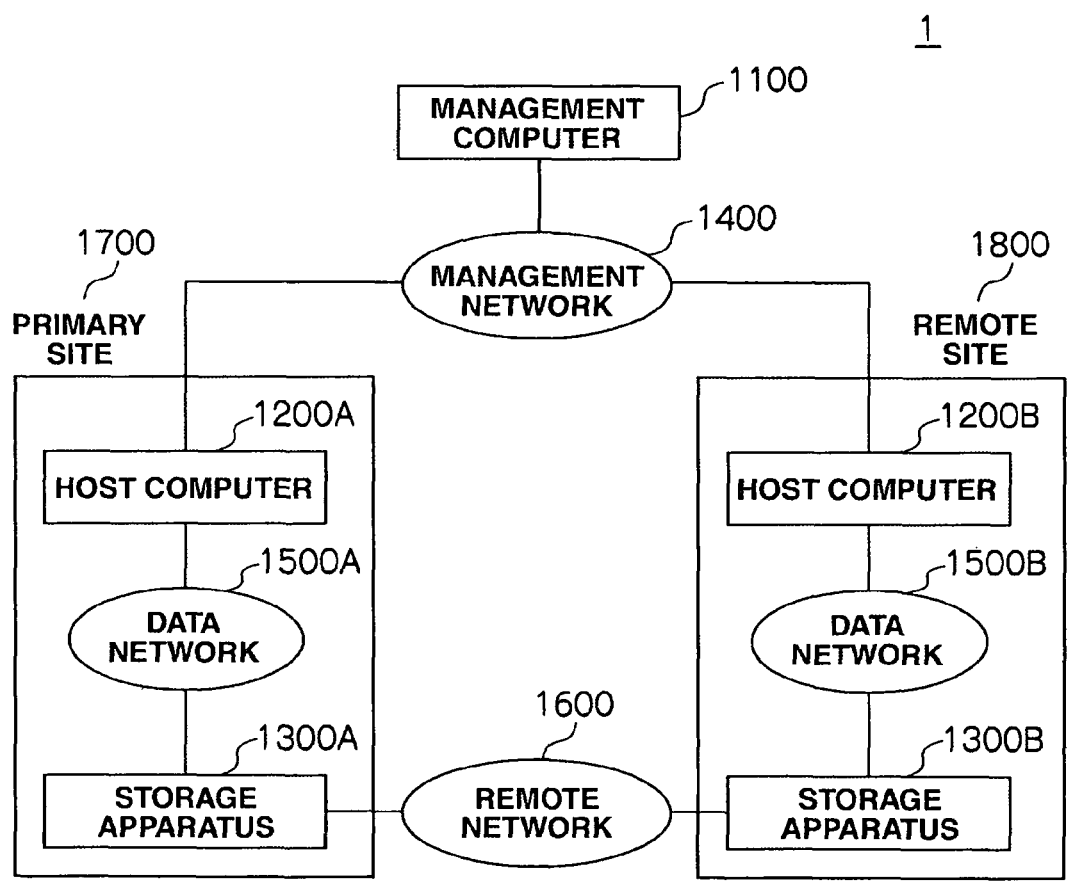
FIG. 1 is a diagram showing the configuration of a storage system according to the first embodiment of the present invention.

FIG. 1 is a block diagram showing the configuration of a storage system according to the first embodiment. In this storage system 1, a storage apparatus 1300 (1300A, 1300B) and a host computer 1200 (1200A, 1200B) are mutually connected via a data network 1500 (1500A, 1500B). Although the data network 1500 is a storage area network in the first embodiment, it may also be an IP (Internet Protocol) network or other data communication networks.

The host computer 1200 and a management computer 1100 are connected via a management network 1400. Although the management network 1400 is an IP network in the first embodiment, it may also be a storage area network or other data communication networks. Although this embodiment explains a case where the management computer 1100 is not directly connected to the storage apparatus 1300 and acquires information via the host computer 1200, the present invention can also be worked with a configuration where the management computer 1100 is directly connected to the storage apparatus 1300. Moreover, although the data network 1500 and the management network 1400 are configured as separate networks in this embodiment, these may also be configured from the same network, and the management computer 1100 and the host computer 1200 may also be configured as the same computer. Although for the sake of explanation FIG. 1 explains a case where there are two storage apparatuses 1300, two host computers 1200 and one management computer 1100, the present invention is not limited to this configuration.

A set of the host computer 1200 and the storage apparatus 1300 and the data network 1500 connecting the two is referred to as a site in the first embodiment. A plurality of sites are generally installed at geographically distant locations. This is so that, when a certain site becomes a victim to disaster, business can be continued in another site. FIG. 1 is configured from a primary site 1700 for conducting business and a remote site 1800 as a backup site. This kind of configuration is referred to as a 2 data center (hereinafter referred to as "2DC") configuration.

With the 2DC configuration, remote copy is performed between the primary site 1700 and the remote site 1800 via a remote network 1600. Remote copy is the technology of duplicating data by copying data of a certain volume in a storage apparatus to a volume in a separate storage apparatus. According to the remote copy technology, even when a failure occurs in one volume and becomes inoperable, the system operation can be continued by using the data stored in the other volume. The two volumes of a copy source and a copy destination in a remote copy relationship are referred to as a copy pair.

Figure 2:
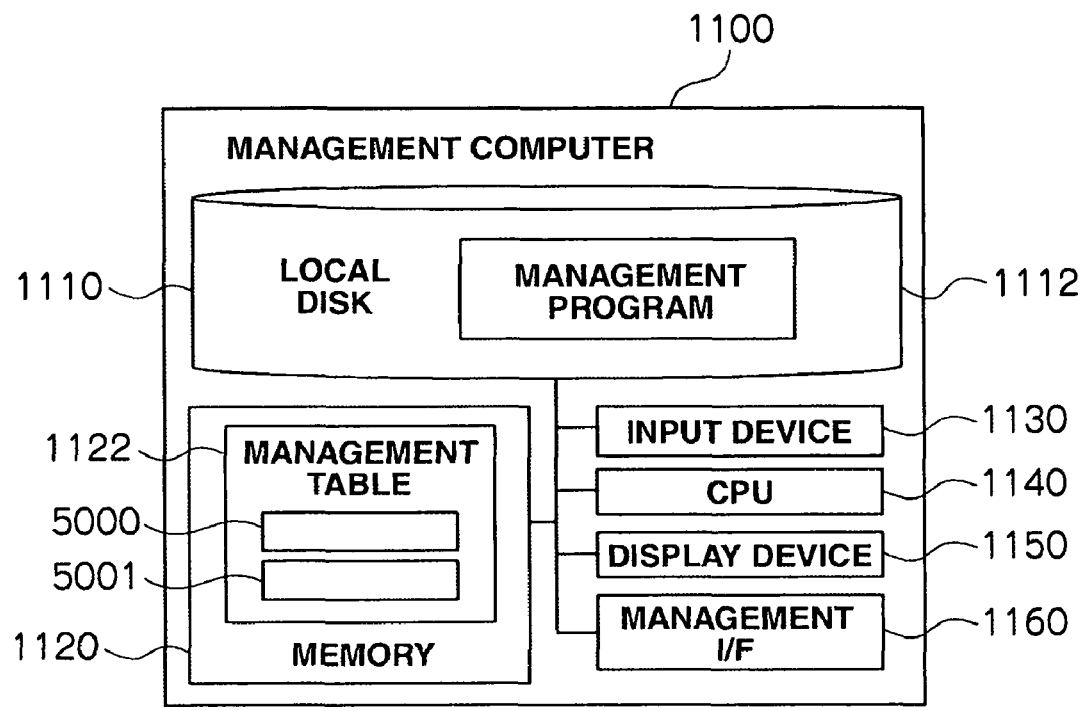
FIG. 2 is a diagram showing the configuration of a management computer according to the first embodiment.
Figure 3:
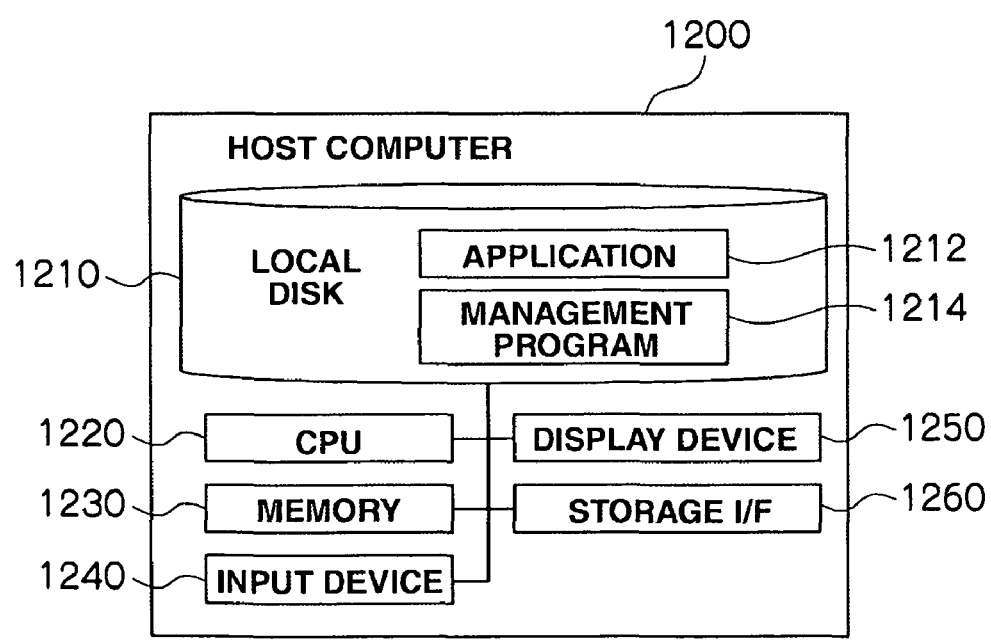
FIG. 3 is a diagram showing the configuration of a host computer according to the first embodiment.
Figure 4:
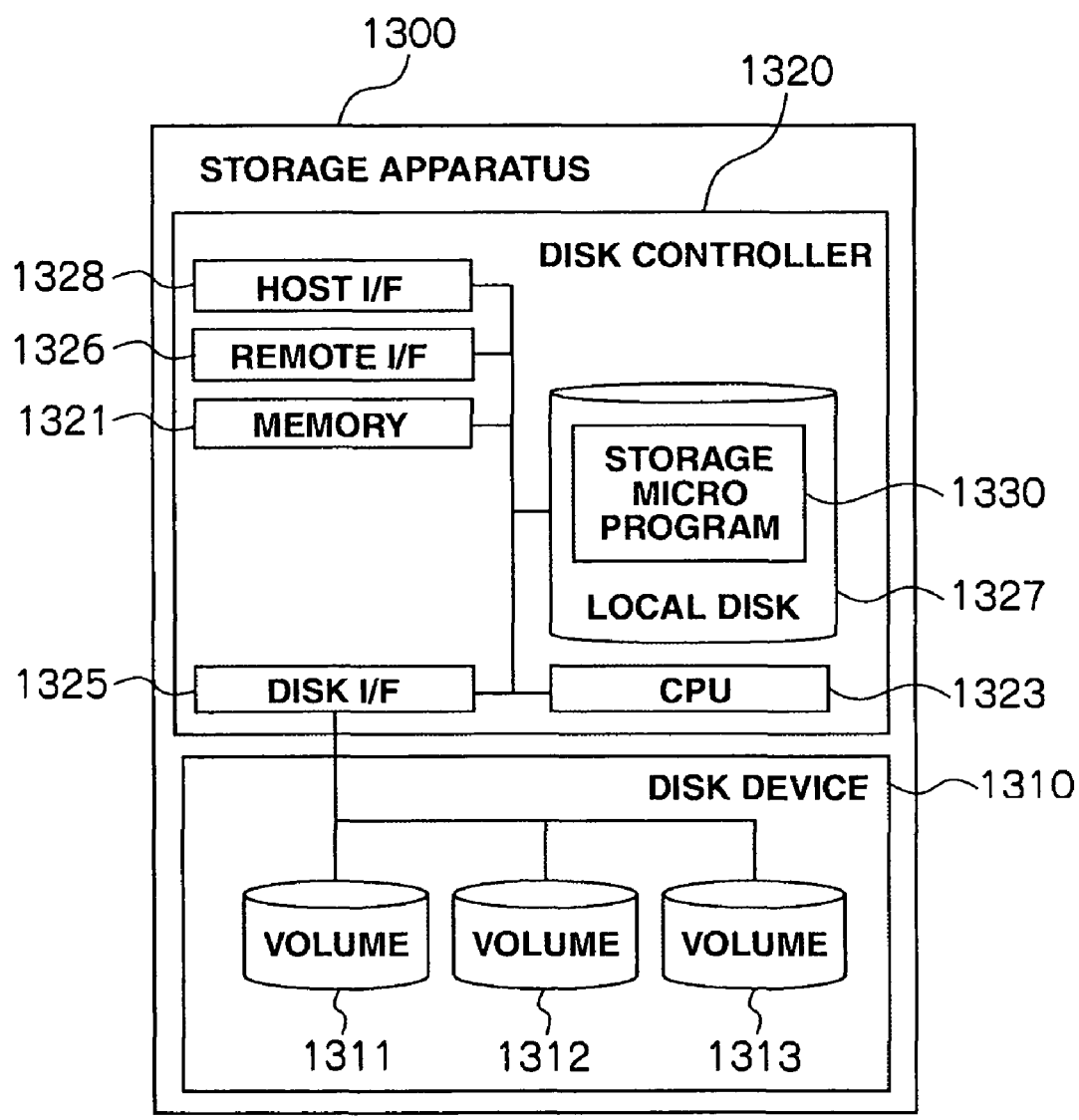
FIG. 4 is a diagram showing the configuration of a storage apparatus according to the first embodiment.

The configuration of the management computer 1100 is shown in FIG. 2, the configuration of the host computer 1200 is shown in FIG. 3, and the configuration of the storage apparatus 1300 is shown in FIG. 4.

FIG. 2 is a diagram showing the configuration of the management computer 1100. The management computer 1100 includes an input device 1130 such as a keyboard or a mouse, a CPU (Central. Processing Unit) 1140, a display device 1150 such as a CRT (Cathode Ray Tube), a memory 1120, a local disk 1110, and a management I/F 1160 for sending and receiving data and control instructions to and from the host computer 1200 for system management.

The local disk 1110 is a disk device such as a hard disk connected to the management computer 1100, and stores a management program 1112.

The management program 1112 is loaded in the memory 1120 of the management computer 1100, and executed by the CPU 1140. The management program 1112 is a program for providing the function for monitoring the copy pairs of one or more storage apparatuses via the input device 1130 such as a keyboard or a mouse and the display device 1150 such as a graphical user interface (GUI).

Details concerning the management table 1122 in the memory 1120 will be described later. The management I/F 1160 is an interface to the management network 1400, and sends and receives data and control instructions to and from the host computer 1200.

FIG. 3 is a diagram showing the configuration of the host computer 1200. The host computer 1200 includes an input device 1240 such as a keyboard or a mouse, a CPU 1220, a display device 1250 such as a CRT, a memory 1230, a storage I/F 1260, and a local disk 1210.

The storage I/F 1260 is an interface to the data network 1500, and sends and receives data and control instructions to and from the storage apparatus 1300. The local disk 1210 is a disk device such as a hard disk connected to the host computer 1200, and stores an application 1212 and a management program 1214.

The application 1212 is loaded in the memory 1230 of the host computer 1200, and executed by the CPU 1220. The application 1212 is a program for executing processing by reading and writing data from and into the volume of the storage apparatus 1300 and, for instance, is a DBMS (Data Base Management System) or a file system. Although for the sake of explanation FIG. 3 shows a case where there is one application 1212, the present invention is not limited to this configuration.

The management program 1214 is loaded in the memory 1230 of the host computer 1200, and executed by the CPU 1220. The management program 1214 is a program for acquiring information of the storage apparatus 1300 based on commands from the management computer 1100. The information is, for instance, status information of the copy pair described later.

FIG. 4 is a diagram showing the configuration of the storage apparatus 1300. The storage apparatus 1300 is configured from a disk device 1310 for storing data, and a disk controller 1320 for controlling the storage apparatus 1300.

The disk device 1310 is configured from a plurality of volumes 1311, 1312, 1313. A volume may be a physical volume such as a hard disk drive (HDD), or a logical volume such as a logical device, and there is no particular limitation on the type of volume in the present invention. Although for the sake of explanation FIG. 4 shows three volumes, the present invention is not limited to this configuration. Volumes are able to configure a copy pair.

The disk controller 1320 is provided with a host I/F 1328, a remote I/F 1326, a disk I/F 1325, a memory 1321, a CPU 1323, and a local disk 1327.

The local disk 1327 is a disk device such as a hard disk connected to the disk controller 1320, and stores a storage micro program 1330.

The storage micro program 1330 is loaded in the memory 1321 of the disk controller 1320, and executed by the CPU 1323. Although the first embodiment explains a case where the storage micro program 1330 is stored in the local disk 1327 of the disk controller 1320, and present invention is not limited to this configuration. For example, it is also possible to provide a flash memory of the like of the disk controller 1320, and store the storage micro program 1330 in that flash memory or an arbitrary disk in the disk device 1310.

The storage micro program 1330 controls the copy pair or acquires the copy pair status upon receiving a command from the host computer 1200. As control concerning the copy pair, there is copy pair creation of newly creating a copy pair, copy pair suspension of temporarily suspending the synchronous relationship, and copy pair resynchronization of matching the contents of a secondary-side volume with the contents of a primary-side volume from the suspension status. Acquisition of the copy pair status is the process of acquiring the status of the respective copy pairs based on which of the foregoing controls.

The host I/F 1328 is an interface to the data network 1500, and sends and receives data and control instructions to and from the host computer 1200. The remote I/F 1326 is an interface to the remote network 1600, and is used in the data transfer of remote copy to be performed across sites. The disk I/F 1325 is an interface to the disk device 1310, and sends and receives data and control instructions.

The host computer registration table 5001 and the pair status monitoring table 5000 shown in FIG. 5 are tables configuring the management table 1122 in the first embodiment. The host computer registration table 5001 is created in the management table 1122, and includes an identifier of the host computer 1200 and information required for calling the host computer 1200. An example of such information required for calling the host computer 1200 is an IP address and a port number. Since the configuration of this table is simple, the illustration thereof is omitted.

FIG. 5 shows the pair status monitoring table 5000 configuring the management table 1122 in the management computer 1100. The pair status monitoring table 5000 includes a pair status field 5100, a disaster status field 5200 and a monitoring configuration field 5300. The pair status field 5100 stores the copy pair statuses that can be collected from the respective sites 1700, 1800.

In the first embodiment, the intended configuration is the one configured from the two sites of the primary site 1700 and the remote site 1800, and pair statuses can be acquired from the respective sites 1700, 1800. Thus, in the pair status field 5100, the pair status that can be acquired from the primary site 1700 is stored after P:, and the pair status that can be acquired from the remote site 1800 is stored after R:.

The type of status that can be acquired as the pair status is now explained. In the first embodiment, let it be assumed that 9 types of statuses can be acquired depending on whether the pair status is acquired from the primary side or secondary side of the copy pair, and the status of such copy pair.

The $1^{st}$ status is PAIR(P). This shows that the status was acquired from the primary side, and the primary side and secondary side of the copy pair are in synchronization.

The $2^{nd}$ status is PAIR(S). This shows that the status was acquired from the secondary side, and the primary side and secondary side of the copy pair are in synchronization.

The $3^{rd}$ status is SUSP(P). This shows that the status was acquired from the primary side, and the synchronization of the primary side and secondary side of the copy pair is being temporarily suspended.

The $4^{th}$ status is SUSP(S). This shows that the status was acquired from the secondary side, and the synchronization of the primary side and secondary side of the copy pair is being temporarily suspended.

The $5^{th}$ status is N/A(H). This shows that there is no reply to the status acquisition request issued from the management computer 1100 to the host computer 1200.

The $6^{th}$ status is N/A(S). This shows that the host computer 1200 is unable to return the status information of the copy pair since the host computer 1200 failed to acquire the status from the storage apparatus 1300.

The $7^{th}$ status is PSUE. With the storage system 1, if the secondary-side volume becomes unavailable due to a failure or the like, a command referred to as a "Takeover" is issued to the primary-side storage apparatus 1300, and business is thereafter resumed only with the primary-side volume. This kind of status where a "Takeover" command is issued and operation is carried on only with the primary volume is referred to as PSUE.

The $8^{th}$ status is SSWS. Normally, the secondary-side volume is operating under "write protect." Thus, with the storage system 1 if the primary-side volume becomes unavailable due to a failure or the like, it will not be possible to resume business using the secondary-side volume if nothing is done. Therefore, a command referred to as a "Takeover" is issued to the secondary-side storage apparatus 1300 to realize a status where data can be written into the secondary volume, and business is resumed thereafter. This kind of status where a "Takeover" command is issued and operation is carried on only with the secondary volume is referred to as SSWS.

The $9^{th}$ status is SMPL. This shows that the volume from which the status was acquired is not configuring a copy pair, and is neither a primary side nor a secondary side. Incidentally, even if the operation is being conducted in a copy pair, if a disaster arises to the other side configuring the pair and there is no hope for recovery, the copy pair relationship is cancelled. The status in this case is referred to as SMPL.

The disaster status field 5200 stores, in a case where the combination of the pair status acquired from the respective sites 1700, 1800 is stored in the pair status field 5100, the disaster status that is derived therefrom.

The monitoring configuration field 5300 stores, in a case where the combination of the pair status acquired from the respective sites 1700, 1800 is stored in the pair status field 5100, the monitoring condition set to the primary site 1700 after P:, and the monitoring condition set to the remote site 1800 after S:.

Reference numerals 5010 to 5080 are components of the pair status monitoring table 5000 when the primary site 1700 is configuring the primary-side remote copy and the remote site 1800 is configuring the secondary-side remote copy in the storage system 1 having the configuration shown in FIG. 1.

The component 5010 shows normal (no disaster) status; that is, a status where the primary side and secondary side of the copy pair are in synchronization. Here, since it would be redundant to acquire the status from both the primary side and the secondary side, the status only needs to be acquired from the primary side. Accordingly, as the monitoring configuration, it would suffice to monitor the primary site 1700 to make sure that it is in a PAIR(P) status. Although the first embodiment explains a case where the primary site 1700 is monitored, it is also possible to monitor the remote site 1800 to make sure that it is in a PAIR(S) status.

The component 5020 shows a primary site disaster status; that is, there is no reply from the host computer 1200A of the primary site 1700, and the pair deletion can only be detected from the remote site 1800. Here, the primary site 1700 is not monitored until the primary site 1700 is recovered, and it would suffice to monitor the remote site 1800 to make sure that it is in an SMPL status.

The component 5030 shows a status where the host computer 1200B of the remote site 1800 took over the business since the host computer 1200A of the primary site 1700 crashed, a "Takeover" command was issued to the secondary-side storage apparatus 1300B, and the remote site 1800 is in synchronization as the primary side of the copy pair. Here, the primary site 1700 is not monitored until the host computer 1200A of the primary site 1700 recovers from the failure, and it would suffice to monitor the remote site 1800 to make sure that it is in a PAIR(P) status. In this case, since a failure occurred only in the host computer 1200A of the primary site 1700, the storage apparatuses 1300A, 1300B of both sites 1700, 1800 are operating. Thus, if a "Takeover" command is issued, an operation of switching the primary/secondary relationship of the primary site 1700 and the remote site 1800 is performed.

The component 5040 shows a status where business is continued only with the remote site 1800 by issuing a "Takeover" command from the remote site 1800 due to a storage apparatus failure in the primary site 1700. Here, the primary site 1700 is not monitored until the storage apparatus of the primary site 1700 recovers from the failure, and it would suffice to monitor the remote site 1800 to make sure that it is in an SSWS status.

The component 5050 shows a remote site disaster status; that is, a status where there is no reply from the host computer 1200B of the remote site 1800, and the pair relationship is deleted. Here, the remote site 1800 is not monitored until the remote site 1800 is recovered, and it would suffice to monitor the primary site 1700 to make sure that it is in an SMPL status.

The component 5060 shows a status where, although the host computer 1200B of the remote site 1800 crashed, a failure has not occurred in the storage apparatus 1300B. Thus, although there is no reply from the host computer 1200B of the remote site 1800, the primary site 1700 is in synchronization as the primary side of the copy pair. Here, the remote site 1800 is not monitored until the host computer of the remote site 1800 recovers from the failure, and it would suffice to monitor the primary site 1700 to make sure that it is of a PAIR(P) status.

The component 5070 shows a status where business is continued only with the primary site 1700 by issuing a "Takeover" command from the primary site 1700 due to a storage apparatus failure in the remote site 1800. Here, the remote site 1800 is not monitored until the storage apparatus of the remote site 1800 recovers from the failure, and it would suffice to monitor the primary site 1700 to make sure that it is in a PSUE status.

The component 5080 shows a status where the synchronization of the primary side and secondary side of the copy pair is temporarily suspended due to a network failure between the sites. Here, it would suffice to monitor the primary site 1700 and the remote site 1800 to make sure that they are respectively in a SUSP(P) status and a SUSP(S) status.

FIG. 6 is a flowchart showing the monitoring condition change processing to be executed by the management program 1112 in the management computer 1100.

When this processing is started at step 6100, it foremost checks the status of an end command from a user (step 6110). If there is an end command (step 6110; YES), this processing is ended (step 6230).

If there is no end command (step 6110; NO), a status acquisition request is issued to the management program 1214 of all host computers 1200 registered in the host computer registration table 5001 of the management table 1122 (step 6120).

The management program 1214 in the host computer 1200 that received the status acquisition request acquires the copy pair status based on this command, and returns the acquired status to the management computer 1100. When the management computer 1100 receives the reply of the copy pair status, it refers to the pair status management table 5000 (step 6130).

A column coinciding with the acquired status of the primary site 1700 and the remote site 1800 is searched among the components 5010 to 5080 (step 6140).

If there is no coinciding column (step 6140; NO), it is either an unforeseen status where an unexpected failure has occurred, or a transitional status where the status will change to one of the components 5010 to 5080 after waiting awhile. Since it is not possible to differentiate the unforeseen failure and the transitional status, an alert is notified to the administrator (step 6210) and, after standing by for a given period of time (step 6220), the routine returns to step 6110 once again to reacquire the status.

If there is a coinciding column (step 6140; YES), the monitoring configuration field 5300 of the coinciding column is referred to in order to configure the monitoring condition (step 6150).

After setting the configuration, the routine stands by for a given period of time (step 6160). This is because the first embodiment is anticipating a mode where information is acquired by the host computer 1200 from the management computer 1100 in given intervals based on the polling method.

Subsequently, information is acquired based on the monitoring condition (step 6170). If the monitoring configuration is STOP, since it is not necessary to conduct monitoring, information is not requested to the host computer 1200.

After information is acquired from the host computer 1200, whether the acquired status satisfies the monitoring configuration is confirmed (step 6180). If the acquired status is not the same as the monitoring configuration (step 6180; NO), this shows that the configuration has been changed. Here, it is necessary to acquire information from all host computers 1200 to detect how the configuration was changed. Thus, the routine returns to step 6110, and that status of all host computers 1200 is reacquired at step 6120.

Meanwhile, if the acquired status is the same as the monitoring configuration (step 6180; YES), the status of notification from the host computer 1200 is confirmed (step 6190).

Subsequently, the management program 1112 confirms the acquired status of a notification from the management program 1214 in the host computer 1200. The management program 1214 in the host computer 1200 issues a notice to the management computer 1100 on start-up. If the received notice was sent from an unknown host computer 1200, the management program 1112 in the management computer 1100 registers that host computer 1200 in the host computer registration table 5001 of the management table 1122.

Even if the notice was sent from a known host computer 1200, since the management program 1214 in the host computer 1200 is also rebooted during failure recovery, a notice is sent from the host computer 1200 to the management computer 1100 at the timing of failure recovery.

Like this, if a notice is sent from the host computer 1200 (step 6190; YES), since this means that there was some kind of configuration change involving failure recovery, the routine returns to the initial step 6110, and reacquires the status from all host computers 1200.

Meanwhile, if a notice is not sent from the host computer 1200 (step 6190; NO), this means that there was no configuration change. Accordingly, the status of an end command from the user is checked (step 6200), the processing is ended if there is an end command (step 6230), and the routine proceeds to step 6160 if there is no end command in order to perform polling in given intervals.

Although the first embodiment explained a case of monitoring a copy pair, the present invention can also be worked by monitoring a copy group. In addition, although remote copy was used in this invention, the present invention can also be worked by in the case of local copy.

Second Embodiment

Although the first embodiment focuses only on the copy pair status, it is also possible to additionally perform the monitoring configuration of performance information. For example, if the remote copy explained in the first embodiment is asynchronous remote copy using a journal volume, it is possible to provide a scheme of monitoring the amount of journal volume being used, and notifying an alert to the user when such amount exceeds a predetermined threshold value.

In the second embodiment, as a variation of the first embodiment, explained is a case of performing the monitoring configuration of performance information of asynchronous remote copy using a journal volume in addition to the copy pair status.

A journal volume is a volume provided to the primary site in asynchronous remote copy, and is used for temporarily buffering the write data that has not yet been reflected in the storage apparatus of the remote site. Since the journal volume may overflow if the network band decreases or the business I/O (Input Output) increases unexpectedly, it is standard practice to set a threshold value and to monitor the journal volume to make sure it does not exceed such threshold value.

Since the configuration of the storage system in the second embodiment is the same as the configuration of the storage system 1 in the first embodiment, the same reference numeral is given to the same components in the ensuing explanation.

A pair status monitoring table 7000 shown in FIG. 7, and a threshold value determination table 8000 and a host computer registration table 5001 shown in FIG. 8 are tables configuring the management table 1122 in the second embodiment. The pair status monitoring table 7000 and the threshold value determination table 8000 are now explained in detail.

FIG. 7 shows the pair status monitoring table 7000 in the case of acquiring the usage of a journal volume of asynchronous remote copy as performance information, and monitoring the threshold value. Here, only the difference in the pair status monitoring table 7000 in comparison to the pair status monitoring table 5000 shown in FIG. 5 is explained. The pair status field 5100 and the disaster status field 5200 are configured the same as in the pair status monitoring table 5000.

The difference is in that the setting of a journal (hereinafter referred to as "JNL") is added in addition to the monitoring of the copy pair status in the monitoring configuration field 5300. Specifically, when "JNL" is indicated, the threshold value of the journal volume in the indicated site is monitored. The threshold value is decided by the threshold value determination table 8000 described later. The monitoring of the threshold value of the journal volume only fulfills the purpose when the copy pair status is PAIR; that is, when the primary volume and secondary volume are in synchronization.

Thus, in the pair status monitoring table 7000, the threshold value of the journal volume only needs to be monitored in the cases of 7010, 7030, 7060 where the copy pair status is PAIR. Incidentally, the primary site 1700 is subject to JNL monitoring in the cases of 7010 and 7060 since the primary site 1700 is the primary side, and the remote site 1800 is subject to JNL monitoring in the case of 7030 since the remote site 1800 is the primary side.

FIG. 8 shows the threshold value determination table 8000 for deciding the threshold value of the journal. The threshold value determination table 8000 includes a copy pair name field 8100, a copy pair capacity field 8200 and a JNL threshold value field 8300. Although the second embodiment explains a case where the threshold value of the journal volume is 1% of the volume capacity configuring the copy pair, the present invention is not limited to this value. The present invention can also be worked by allowing the user to designate this value.

In the second embodiment, FIG. 8 shows that there is a copy pair named CG01, and the capacity of this copy pair is 300 TB, and the JNL threshold value is 3.0 TB.

Only the difference in the processing flow in comparison to the flowchart shown in FIG. 6 is explained below.

At step 6150, the pair status monitoring table 7000 is referred to upon configuring the monitoring condition, and the threshold value of the journal volume is set if required.

When acquiring the status at step 6170, the journal volume usage is acquired if the threshold value of the journal volume is included in the monitoring condition.

At step 6180, if the journal usage has been acquired at step 6170 upon checking whether the acquired status coincides with the monitoring condition, whether this is below the threshold value stored in the threshold value determination table 8000 is confirmed. If the journal usage is below the threshold value, the routine proceeds to step 6190. If the journal usage is greater than the threshold value, the routine deems that the "status is not satisfying the monitoring condition" and proceeds to step 6110.

According to the foregoing processing, the monitoring configuration of performance information of asynchronous remote copy using a journal volume can also be performed in addition to the copy pair status.

Third Embodiment

The first embodiment explained a case of detecting a configuration change and switching the monitoring configuration after an unexpected event such as a disaster or failure, which the administrator cannot predict the timing of occurrence, has occurred and the configuration has been changed. Nevertheless, there are tasks such as backup that are performed based on a predetermined schedule and affect the copy pair status or configuration. Although the first embodiment explained a case of switching the monitoring configuration by detecting a configuration change based on the monitoring result, if a schedule is set in advance, it is also possible to switch the monitoring configuration in advance by giving consideration to such schedule.

The third embodiment explains a method of triggering the switching the monitoring configuration based on both the detection of a configuration change and execution of the schedule.

Since the configuration of the storage system in the third embodiment is the same as the configuration of the storage system 1 in the first embodiment, the same reference numeral is given to the same components in the ensuing explanation.

A pair status monitoring table 9000 shown in FIG. 9, and a schedule table 10000 and a host computer registration table 5001 shown in FIG. 10 are tables configuring the management table 1122 in the third embodiment. The pair status monitoring table 9000 and the schedule table 10000 are now explained in detail.

FIG. 9 shows the pair status monitoring table 9000 considered the execution of the schedule. Here, only the difference in comparison to the pair status monitoring table 5000 shown in FIG. 5 is explained. In explaining the pair status monitoring table 9000, 2 statuses in addition to the 9 statuses described previously are explained.

The 10$^{th}$ status is RESYNC(P). This shows a status where the status was acquired from the primary side, and the status where the synchronization of the primary side and secondary side of the copy pair is suspended is being returned to the status of being resynchronized.

The 11$^{th}$ status is RESYNC(S). This shows a status where the status was acquired from the secondary side, and the status where the synchronization of the primary side and secondary side of the copy pair is suspended is being returned to the status of being resynchronized.

The field configuration of the pair status monitoring table 9000 is the same as the pair status monitoring table 5000. The components 5010 to 5080 of the pair status monitoring table are the same as the pair status monitoring table 5000.

The component 9090 shows a status where the synchronization of the primary side and secondary side of the copy pair is suspended due to a backup operation being performed. Here, it would suffice to monitor the primary site 1700 and the remote site 1800 to make sure that they are respectively in a SUSP(P) status and a SUSP(S) status. Although this is the same condition as the component 5080, this status is deemed to be a normal status during backup, and a network failure is suspected when this status is detected in any other period of time.

The 9100 shows a status where the backup is complete, and the status where the synchronization of the primary side and secondary side of the copy pair is suspended is being returned to the status of being resynchronized. Here, it would suffice to monitor the primary site 1700 and the remote site 1800 to make sure that they are respectively in a RESYNC(P) status and a RESYNC(S) status. When this resynchronization processing is complete, the primary side and the secondary side will once again become a synchronized status.

FIG. 10 shows the schedule table 10000. The time field 10100 stores the time that the task is to be executed. The task field 10200 stores the name of the task to be executed at the foregoing time. The applicable rule field 10300 stores the number of the monitoring condition to be applied upon executing the task. This number is the number indicated at the left side of the pair status monitoring table 9000.

For example, the component 10010 shows that a backup task is to be executed between 2:00 and 3:00, and rule #9 of the pair status monitoring table 9000 should be applied; that is, it would suffice to monitor to make sure that the secondary side and the primary side of the copy pair are of a suspend status that is suspending synchronization.

The management program 1112 in the management computer 1100 refers to the schedule table 10000, and performs the monitoring condition setting processing when it reaches the task start time. In the third embodiment, the task start time is 2:00, 3:00 and 3:10.

The monitoring condition setting processing is started when it reaches the task start time, and if the monitoring configuration at such time is of a previous field corresponding to the schedule table 10000, the rule stored in the applicable rule field is applied. For example, if the monitoring condition applicable at such time is #9; that is, if the suspension of pair synchronization is being monitored in the primary site 1700 and the remote site 1800, the monitoring condition is switched to #10 at 3:00. If this kind of status setting is not performed, this means that the backup processing is not operating normally. Thus, if this kind of status setting is not performed, this is notified to the user so that the management computer 1100 can notify the user that a failure or the like has occurred. Here, the setting processing of the monitoring condition is not performed. The user may be the administrator of the management computer 1100 or the administrator of the respective sites 1700, 1800.

By performing the foregoing processing in addition to the processing of the flowchart shown in FIG. 6, the switching of the monitoring configuration can be triggered by both the detection of a configuration change and the execution of the schedule.

Fourth Embodiment

The first embodiment to the third embodiment explained cases where one host computer 1200 is connected to the storage apparatus 1300. Nevertheless, the present invention can also be worked by connecting a plurality of host computers to a single storage apparatus.

Figures 11, 12:
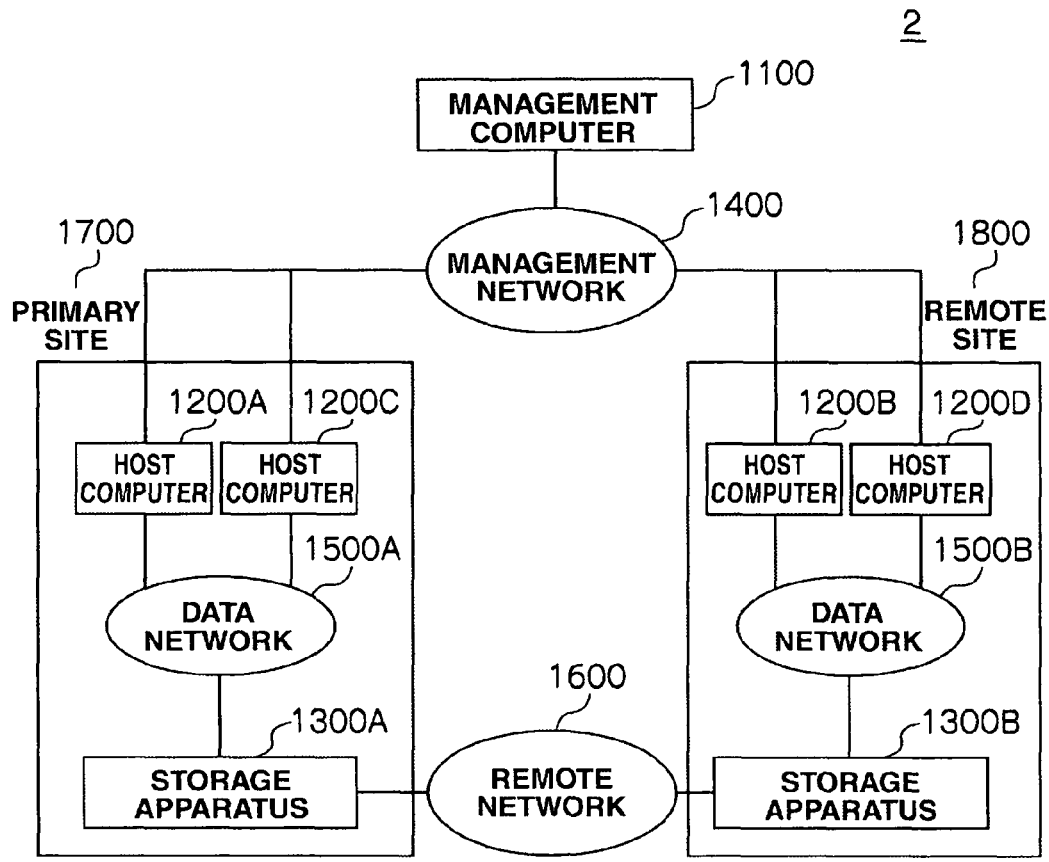
FIG. 11 is a diagram showing the configuration of a storage system according to a fourth embodiment of the present invention.
FIG. 12 is a diagram showing an example of a threshold value determination table according to the fourth embodiment.

FIG. 11 is a block diagram showing the configuration of a storage system 2 according to this embodiment. The difference in comparison to the storage system 1 shown in FIG. 1 is explained. In the storage system 2, one storage apparatus 1300 (1300A, 1300B) and two host computers 1200 (1200A, C, 1200B,D) are mutually connected via a data network 1500 (1500A, 1500B) in the respective sites of the primary site 1700 and the remote site 1800.

Although the fourth embodiment explains a case where two host computers 1200 are connected to one storage apparatus 1300, the present invention is not limited to this configuration. The host computer 1200 does not have to be a physical host computer, and may also be a virtual host computer. In other words, by applying the server virtualization technology, the present invention can also be worked with a configuration of operating a plurality of virtual host computers in a single physical host computer.

In this configuration, let it be assumed that business is being operated respectively in the two host computers 1200A,C of the primary site 1700, data is written from here into the storage apparatus 1300A of the primary site 1700, and data is further transferred to the storage apparatus 1300B of the remote site 1800 via asynchronous remote copy. Here, the name of the copy pairs used by the respective host computers 1200A,C of the primary site 1700 shall be CG01 and CG02. Although the fourth embodiment explains a case where CG01 and CG02 are a copy pair, the present invention can also be worked when they are a copy group.

A pair status monitoring table 7000 shown in FIG. 7, and a threshold value determination table 12000 shown in FIG. 12 and a host computer registration table 5001 are tables configuring the management table 1122 in this embodiment. The threshold value determination table 12000 is now explained in detail.

FIG. 12 shows the threshold value determination table 12000 for deciding the threshold value of the journal. The field configuration of the threshold value determination table 12000 is the same as the threshold value determination table 8000 shown in FIG. 8. Although the fourth embodiment explains a case where the threshold value of the journal volume is 1% of the volume capacity configuring the copy pair, the present invention is not limited to this value. The present invention can also be worked by allowing the user to designate this value. When two copy pairs of CG01, CG02 are defined from the threshold value determination table 12000, it is evident that the copy pair capacity of CG01 is 300 TB and the JNL threshold value is 3.0 TB, and that the copy pair capacity of CG02 is 250 TB and the JNL threshold value is 2.5 TB.

During normal operation, the two businesses are operated in the primary site 1700. Thus, the monitoring of the JNL is performed in the primary site 1700 with a threshold value of 5.5 TB.

Only the difference in the processing flow in comparison to the flowchart shown in FIG. 6 is explained below. Upon receiving a notice from the management program 1214 in the host computer 1200 at step 6190, it is necessary to give consideration to the number of host computers 1200. When a disaster or a failure occurs, there are cases where a "Takeover" command is issued from the primary site 1700 to the remote site 1800. In this case, monitoring is performed to see which site the primary side of the copy pair is located regarding the respective copy pairs, and the threshold value is monitored in the primary-side site based on the threshold value determination table 12000.

In addition to the occurrence of a disaster or a failure, there are cases where primary/secondary is switched in copy pair units when switching the business from the primary site 1700 to the remote site 1800 for maintenance or load balancing, or one side is stopped. In this case also, the management program 1214 in the host computer 1200 notifies the management computer 1100 to the effect that the business has been transferred. Upon receiving this notice, the management computer 1100 needs to reacquire all statuses and detect that the business has been transferred between the sites.

In the foregoing case, the sum of the JNL threshold values of the copy pairs corresponding to the transferred business is set as the threshold value to be monitored in the respective sites. For example, if the primary side of both CG01, CG02 is the primary site 1700, the JNL threshold value of the primary site 1700 is set to 5.5 TB. If the primary side of CG01 is in the primary site 1700 and the primary side of CG02 is in the remote site 1800, the JNL threshold value of the primary site 1700 is set to 3.0 TB, and the JNL threshold value of the remote site 1800 is set to 2.5 TB.

By applying technology known as the server virtualization technology, it is possible to adopt a configuration where a plurality of virtual host computers are operated on a single physical host computer 1200. By applying the server virtualization technology to a storage system having a multi-site configuration, there is an advantage in that the construction costs of the remote site can be reduced since the present invention can be worked by only having to prepare a small number of physical host computers on the remote site side that only performs backup in normal times and only performs business during the occurrence of a disaster or the like.

In the foregoing case, the present invention can also be worked when the management program managing the virtual host computer notifies the management program 1112 in the management computer 110 when the configuration of the virtual host computer is changed, and receiving such notice at step 6190 of the flowchart shown in FIG. 6.

Fifth Embodiment

As the remote copy, there is synchronous remote copy in addition to asynchronous remote copy. Synchronous remote copy is a method where the write I/O issued from the host computer performing business is stored both the primary-side storage apparatus and the secondary-side storage apparatus, and a write completion response is thereafter returned to the host computer performing business. With synchronous remote copy, since the data of the primary side and secondary side will constantly coincide, there will be no data loss during a disaster or the like.

As explained in the first to fourth embodiments, by performing remote copy between two sites, even if one site becomes a victim to disaster, business can be continued with the remaining site. Nevertheless, if one site becomes a victim to disaster and business is operated only with the remaining one site, redundancy will be lost. In addition, if the two sites are installed at close locations, although there is an upside in that the amount of data that will be lost during a disaster can be minimized since synchronous remote copy can be used due to the minimal network delay, there is a down side in that it is vulnerable to large-scale disasters. Meanwhile, when the two sites are installed at distant locations, although there is an upside in that it is durable against large-scale disasters, there is a down side in that the amount of data that will be lost during a disaster will be large since asynchronous remote copy must be used due to the long network delay.

Thus, in order to overcome these drawbacks, there are cases where a 3 data center (hereinafter referred to as "3DC") configuration is adopted which combined a local site in close distance for performing synchronous remote copy to the primary site and a remote site of long distance for performing asynchronous remote copy. By adopting the 3DC configuration, if only the primary site becomes a victim to disaster, it is possible to continue business while minimizing the data loss in the local site and, when both the primary site and local site become a victim to disaster in large-scale disasters or the like, it is possible to continue business while minimizing the data loss in the remote site.

The fifth embodiment explains a case where the present invention can also be worked when adopting the 3DC configuration.

Figure 13:
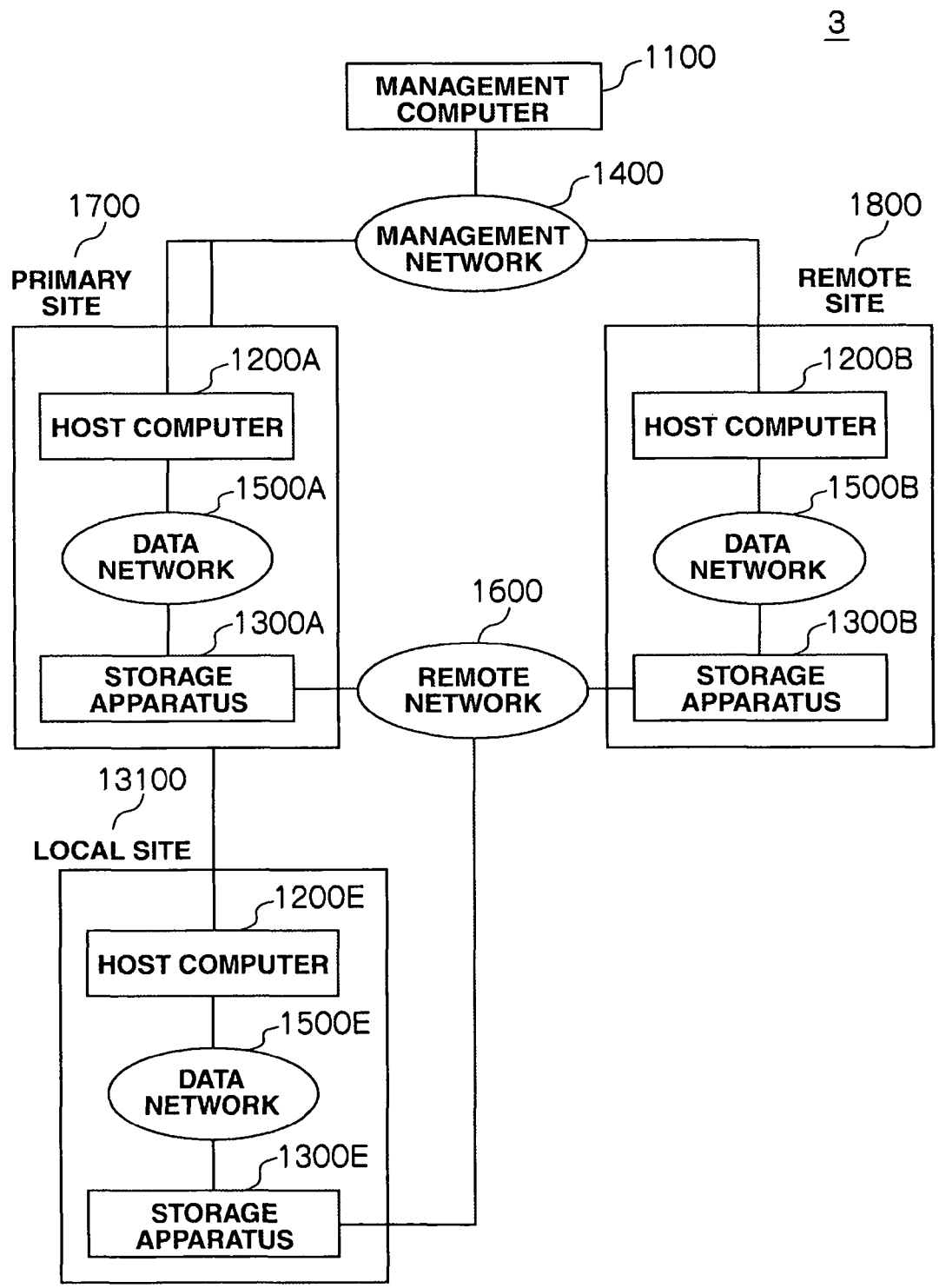
FIG. 13 is a diagram showing the configuration of a storage system according to a fifth embodiment of the present invention.

FIG. 13 is a block diagram showing the configuration of a storage system in the fifth embodiment. The storage system 3 is provided with a local site 13100 in addition to the configuration shown in FIG. 1. The configuration of the local site 13100 is the same as the other sites 1700, 1800. The configuration of the management computer 1100, the host computer 1200E, and the storage apparatus 1300E configuring the local site 13100 is the same as the explanation of FIG. 2, FIG. 3, and FIG. 4 in the first embodiment.

The host computer 1200E in the local site 13100 is mutually connected with the management computer 1100 via the management network 1400. The storage apparatus 1300E in the local site 13100 is mutually connected with the storage apparatuses 1300A, 1300B of the other sites via the remote network 1600. Although for the sake of explanation FIG. 13 explains a case where there are three storage apparatuses 1300, three host computers 1200 and one management computer 1100, the present invention is not limited to this configuration.

In this configuration, business is being operated in the host computer 1200A of the primary site 1700, and data is written from here into the storage apparatus 1300A of the primary site 1700. Moreover, let it be assumed that synchronous remote copy is being performed between the primary site 1700 and the local site 13100, and asynchronous remote copy is being performed between the primary site 1700 and the remote site 1800. Here, let it be assumed that difference management of data written from the primary site 1700 is being performed between the local site 13100 and the remote site 1800 so that, if the primary site 1700 becomes a victim to disaster, they can be promptly switched to a synchronous status of asynchronous remote copy.

Pair status monitoring tables 14000, 14001 shown in FIG. 14 and FIG. 15, and a host computer registration table 5001 are tables configuring the management table 1122 in this embodiment. The pair status monitoring tables 14000, 14001 are now explained in detail.

Upon explaining the pair status monitoring tables 14000 and 14001, 2 types of statuses in addition to the 11 types of statuses described above will be explained.

The 12$^{th}$ status is HOLD(P). This shows a status where the status was acquired from the primary side, and the primary side and secondary side of the copy pair perform difference management, and are able to return to a synchronous status only by transferring differential data during the occurrence of a failure.

The 13$^{th}$ status is HOLD(S). This shows a status where the status was acquired from the secondary side, and the primary side and secondary side of the copy pair perform difference management, and are able to return to a synchronous status only by transferring differential data during the occurrence of a failure.

The pair status monitoring tables 14000 and 14001 include a pair status field 5100, a disaster status field 5200 and a monitoring configuration field 5300. The pair status field 5100 stores the copy pair status that can be collected from the respective sites. In the fifth embodiment, the intended configuration is the one configured from the three sites of the primary site 1700 and the local site 13100 and the remote site 1800, and pair statuses can be acquired from the respective sites. Thus, in the pair status field 5100, the pair status that can be acquired from the primary site 1700 is stored after P:, the pair status that can be acquired from the local site 13100 is stored after L:, and the pair status that can be acquired from the remote site 1800 is stored after R:.

The synchronous remote copy between the primary site 1700 and the local site 13100 is referred to as TC (True Copy), and the asynchronous remote copy between the primary site 1700 and the remote site 1800 is referred to as UR (Universal Replicator). Incidentally, the difference management of data performed between the local site 13100 and the remote site 1800 is referred to as UR2.

The disaster status field 5200 stores the disaster status derived from the combination of pair statuses acquired from the respective sites 1700, 13100, 1800.

In the monitoring configuration field 5300 stores, in a case where the primary/secondary pair status is stored in the pair status field 5100, the monitoring condition set to the primary site 1700 after P:, the monitoring condition set to the local site 13100 after L:, and the monitoring condition set to the remote site 1800 after R:.

Reference numerals 14010 to 14130 are components of the pair status monitoring tables 14000 and 14001 when the storage system 3 is adopting the 3DC configuration combining synchronous remote copy and asynchronous remote copy.

The component 14010 shows a normal (no disaster) status; that is, a status where TC and UR are in synchronization, and UR2 is performing difference management. Here, since it would be redundant to acquire the status from both the primary side and the secondary side, the status only needs to be acquired from the primary side. Accordingly, as the monitoring configuration, it would suffice to monitor TC and UR of the primary site 1700 to make sure that they are respectively in a PAIR(P) status, and monitor UR2 of the local site 13100 to make sure that it is in a HOLD(P) status. Although the fifth embodiment explains a case where the primary side of the respective copy pairs is monitored, it is also possible to monitor the secondary side.

The component 14020 shows a primary site disaster status; that is, a status where the primary site 1700 has crashed and the TC and UR paris have been deleted, and copy is being performed between the local site 13100 and the remote site 1800 as a result of UR2 that was performing difference management becoming a synchronized status. Here, the TC and UR pair in the SMPL status is not monitored, and it would suffice to monitor UR2 in a synchronized status from the primary side of the copy pair; that is, from the local site 13100.

The component 14030 shows a status where the host computer of the primary site has crashed. The host computer 1200 of the local site 13100 takes over the business. TC becomes a synchronization status where the local site 13100 is primary side of the copy pair by "takeover" command. UR becomes a difference management status. Synchronization status where the local site 13100 is primary side of the copy pair. Thus, as the monitoring configuration, the primary site 1700 is not monitored until the host computer of the primary site 1700 recovers from the failure, and, since TC and UR2 of the local site 13100 are respectively in a PAIR(P) status and UR can only be monitored from the remote site 1800 as the secondary side, it would suffice to monitor and make sure that UR is in a HOLD(S) status in the remote site 1800.

The component 14040 shows a status where a storage apparatus failure has occurred in the primary site. Since a failure has occurred in the storage apparatus 1300A of the primary site 1700, the local site 13100 takes over the business. TC and UR are respectively issued a "Takeover" command in the local site 13100 and the remote site 1800 to become a status where data can be written into the secondary-side volume, and copy is performed between the local site 13100 and the remote site 1800 by UR2 that was performing difference management becoming a synchronized status. Therefore, as the monitoring configuration, the primary site 1700 is not monitored until the storage apparatus of the primary site 1700 recovers from the failure, and it would suffice to monitor that TC is in a SSWS status and UR2 is in a PAIR(P) status in the local site 13100, and UR is in a SSWS status in the remote site 1800.

The component 14050 shows a local site disaster status. In other words, the local site 13100 crashed, TC and UR2 pairs are deleted, and only the UR pair is of a synchronized status. Thus, as the monitoring configuration, the local site 13100 is not monitored until the local site 13100 is recovered, and it would suffice to monitor that UR is in a PAIR(P) status in the primary site 1700.

The component 14060 shows a status where, although the host computer of the local site crashed, a failure has not occurred in the storage apparatus. In other words, although there is no reply from the host computer 1200E of the local site 13100, normal status is returned from the primary site and the remote site. Here, the local site is not monitored until the host computer of the local site recovers from the failure, and it would suffice to monitor to make sure that TC and UR are respectively in a PAIR(P) status in the primary site, and UR2 is in a HOLD(S) status in the remote site.

The component 14070 shows a status where a storage apparatus failure has occurred in the local site. Since a failure has occurred in the storage apparatus 1300E of the local site 13100, only the primary site 1700 and the remote site 1800 are in synchronization. Here, the local site 13100 is not monitored until the storage apparatus of the local site 13100 recovers from the failure, and it would suffice to monitor to make sure that TC is in a PSUE status and UR is in a PAIR(P) status in the primary site 1700, and UR2 is in an SSWS status in the remote site 1800.

The component 14080 shows a remote site disaster status. In other words, this is a status where the remote site 1800 has crashed, the UR and UR2 pairs have been deleted, and only the TC pair is of a synchronized status. Thus, as the monitoring configuration, the remote site 1800 is not monitored until the remote site 1800 is recovered, and it would suffice to monitor to make sure that TC is in a PAIR(P) status in the primary site 1700.

The component 14090 shows a status where, although the host computer of the remote site crashed, a failure has not occurred in the storage apparatus. In other words, although there is no reply from the host computer 1200B of the remote site 1800, normal status is returned from the primary site 1700 and the local site 13100. Here, the remote site 1800 is not monitored until the host computer of the remote site 1800 recovers from the failure, and it would suffice to monitor to make sure that TC and UR are respectively in a PAIR(P) status in the primary site 1700, and UR2 is in a HOLD(P) status in the local site 13100.

The component 14100 shows a status where a storage apparatus failure has occurred in the remote site. Since a failure has occurred in the storage apparatus 1300B of the remote site 1800, only the primary site 1700 and the local site 13100 are in synchronization. Here, the remote site 1800 is not monitored until the storage apparatus of the remote site 1800 recovers from the failure, and it would suffice to monitor to make sure that TC in a PAIR(P) status and UR is in a PSUE status in the primary site 1700 is, and UR2 is in a PSUE status in the local site 13100.

The component 14110 shows a status where the synchronization of the primary side and secondary side of the copy pair TC is suspended due to a network failure between the primary site and the local site. Here, it would suffice to monitor to make sure that TC is in a SUSP(P) status and UR is in a PAIR(P) status in the primary site 1700, and TC is in a SUSP(S) status and UR2 is in a HOLD(P) status in the local site 13100.

The component 14120 shows a status where the synchronization of the primary side and secondary side of the copy pair UR is suspended due to a network failure between the primary site and the remote site. Here, it would suffice to monitor to make sure that TC is in a PAIR(P) status and UR is in a SUSP(P) status in the primary site 1700, and TC is in a SUSP(P) status and UR2 is in a HOLD(P) status in the local site 13100.

The component 14130 shows a status where the synchronization of the primary side and secondary side of the copy pair UR2 is suspended due to a network failure between the local site and the remote site. Here, it would suffice to monitor to make sure that TC and UR are in a PAIR(P) status in the primary site 1700, UR2 is in a SUSP(P) status in the local site 13100, and UR2 is in a SUSP(S) in the remote site 1800.

The processing flow of the fifth embodiment is the same as the flowchart showing in FIG. 6 of the first embodiment. The only difference is that the table to be referred to are the pair status monitoring tables 14000 and 14001, and not the pair status monitoring table 5000.

Although the fifth embodiment explained a case where only the pair status is set as the monitoring condition, performance information may also be added as the monitoring condition as explained in the second embodiment.

According to the storage systems 1, 2, 3 in each of the foregoing embodiments, it is possible to alleviate the management burden of the replication administrator by reconfiguring the monitoring method or the monitoring condition according the change in configuration, and reduce the monitoring burden by optimizing the monitoring target.

The present invention can be broadly applied to storage systems and the monitoring condition changing method thereof.

What is claimed is:

1. A storage system, comprising:
   one or more storage apparatuses;
   one or more host computers for reading and writing data from and into the one or more storage apparatuses; and
   a management computer for managing the one or more host computers;
   wherein the one or more storage apparatuses respectively include:
   one or more disk devices for storing data; and
   a plurality of volumes configured from a storage area provided by the one or more disk devices;
   wherein the one or more host computers manage configuration information of a volume group configured from a prescribed number of volumes among the plurality of volumes;
   wherein the management computer detects the status of a configuration change of a volume group by using the configuration information of the volume group and, upon detecting a configuration change, changes the configuration of a monitoring condition of the volume group based on the configuration of the monitoring condition according to the pre-set configuration of the volume group;
   wherein the configuration of the volume group is a copy pair configuration where one volume among the plurality of volumes is set as a primary volume to be subject to data writing from one of the one or more host computers, and a volume that is not the primary volume is set as a secondary volume to become a copy destination of the data written into the primary volume;

wherein the configuration information includes status information showing the status of the copy pair;

wherein the status information includes information concerning a threshold value for restricting the accumulation of data of a journal volume to be used in temporarily accumulating data upon performing the copy asynchronously; and wherein the management computer changes the threshold value of the journal volume upon detecting the configuration change.

2. The storage system according to claim 1, wherein, upon changing the status of the copy pair based on a predetermined schedule, the management computer changes the configuration of a monitoring condition of the copy pair based on the copy pair status to be changed and the configuration of the monitoring condition.

3. The storage system according to claim 2, wherein the management computer changes a monitoring condition based on the monitoring condition if the change in the configuration of the detected copy pair is within a pre-set range, and notifies an administrator of the management computer if the change in the configuration of the detected copy pair is not within a pre-set range.

4. The storage system according to claim 1, wherein the primary volume and the secondary volume are provided in one storage apparatus among the one or more storage apparatuses.

5. The storage system according to claim 1, wherein the primary volume and the secondary volume are respectively provided in different storage apparatuses among the one or more storage apparatuses.

6. The storage system according to claim 1, wherein the configuration of the volume group is the configuration of a copy group configured from a prescribed number of volumes among the plurality of volumes.

7. The storage system according to claim 1, further comprising a plurality of sites configured including one or more storage apparatuses among the one or more storage apparatuses and one or more host computers among the one or more host computers; and wherein the volumes contained in the volume group are respectively provided in one site and another site among the plurality of sites.

8. The storage system according to claim 7, wherein the one site and the other site among the plurality of sites are installed at geographically distant locations.

9. The storage system according to claim 1, wherein the one or more host computers include a plurality of virtual host computers which operate as a virtual host computer in a single physical host computer.

10. A monitoring condition change method of a storage system including one or more storage apparatuses, one or more host computers for reading and writing data from and into the one or more storage apparatuses, and a management computer for managing the one or more host computers, wherein the one or more storage apparatuses respectively include one or more disk devices for storing data, and a plurality of volumes configured from a storage area provided by the one or more disk devices; and wherein the storage system:

manages configuration information of a volume group configured from a prescribed number of volumes among the plurality of volumes;

detects the status of a configuration change of a volume group by using the configuration information of the volume group; and upon detecting a configuration change, changes the configuration of a monitoring condition of the volume group based on the configuration of the monitoring condition according to the pre-set configuration of the volume group;

wherein the configuration of the volume group is a copy pair configuration where one volume among the plurality of volumes is set as a primary volume to be subject to data writing from one of the one or more host computers, and a volume that is not the primary volume is set as a secondary volume to become a copy destination of the data written into the primary volume;

wherein the configuration information includes status information showing the status of the copy pair;

wherein the status information includes information concerning a threshold value for restricting the accumulation of data of a journal volume to be used in temporarily accumulating data upon performing the copy asynchronously; and wherein the storage system changes the threshold value of the journal volume according to the detected configuration change upon changing the configuration of the monitoring condition.

11. The management condition changing method of a storage system according to claim 10, wherein, when the setting is configured to change the status of the copy pair based on a predetermined schedule, the storage system changes the configuration of a monitoring condition of the copy pair based on the copy pair status to be changed and the configuration of the monitoring condition when the copy pair status is to be changed based on the schedule.

12. A management computer for managing one or more host computers in a storage system comprising:

one or more storage apparatuses respectively including one or more disk devices for storing data, and a plurality of volumes configured from a storage area provided by the one or more disk devices; and one or more host computers for reading and writing data from and into the one or more storage apparatuses, and managing configuration information of a volume group configured from a prescribed number of volumes among the plurality of volumes;

wherein the management computer detects the status of a configuration change of a volume group by using the configuration information of the volume group and, upon detecting a configuration change, changes the configuration of a monitoring condition of the volume group based on the configuration of the monitoring condition according to the pre-set configuration of the volume group;

wherein the configuration of the volume group is a copy pair configuration where one volume among the plurality of volumes is set as a primary volume to be subject to data writing from one of the one or more host computers, and a volume that is not the primary volume is set as a secondary volume to become a copy destination of the data written into the primary volume;

wherein the configuration information includes status information showing the status of the copy pair;

wherein the status information includes information concerning a threshold value for restricting the accumulation of data of a journal volume to be used in temporarily accumulating data upon performing the copy asynchronously; and wherein the management computer changes the threshold value of the journal volume upon detecting the configuration change.

13. The management computer according to claim 12, wherein, when the setting is configured to change the status of the copy pair based on a predetermined schedule, the management computer changes the configuration of a monitoring condition of the copy pair based on the copy pair status to be changed and the configuration of the monitoring condition when the copy pair status is to be changed based on the schedule.

\* \* \* \* \*